US009222795B1

(12) United States Patent
Gerlach

(10) Patent No.: US 9,222,795 B1
(45) Date of Patent: Dec. 29, 2015

(54) APPARATUS, SYSTEM AND METHOD FOR DETOUR GUIDANCE IN A NAVIGATION SYSTEM

(71) Applicants: VOLKSWAGEN AG, Wolfsburg (DE); AUDI AG, Ingolstadt (DE)

(72) Inventor: Simon Gerlach, San Mateo, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/520,515

(22) Filed: Oct. 22, 2014

(51) Int. Cl.
*G01C 21/26* (2006.01)
*G01C 21/36* (2006.01)

(52) U.S. Cl.
CPC ............................ *G01C 21/3667* (2013.01)

(58) Field of Classification Search
CPC combination set(s) only.
See application file for complete search history.

(56) References Cited

U.S. PATENT DOCUMENTS

| 5,220,507 | A | 6/1993 | Kirson |
| 6,522,381 | B1 * | 2/2003 | Brandt .......................... 349/142 |
| 7,522,997 | B2 | 4/2009 | Asahara et al. |
| 2010/0088029 | A1 * | 4/2010 | Hu et al. ....................... 701/213 |
| 2010/0138146 | A1 | 6/2010 | Vogt et al. |
| 2012/0242687 | A1 * | 9/2012 | Choi ............................. 345/629 |
| 2013/0173159 | A1 | 7/2013 | Trum et al. |
| 2014/0032112 | A1 * | 1/2014 | Hansen ......................... 701/533 |

FOREIGN PATENT DOCUMENTS

EP 1847805 A2 10/2007

* cited by examiner

*Primary Examiner* — Thomas Tarcza
*Assistant Examiner* — Edward Pipala
(74) *Attorney, Agent, or Firm* — Barnes & Thornburg LLP

(57) ABSTRACT

A system and method for providing navigational maneuver instructions, where a navigation apparatus is configured to generate navigation map data on a navigation system display. The navigation apparatus may include a communications input for receiving at least one of traffic data and vehicle data. A secondary display apparatus may be communicatively coupled to the navigation system, wherein the navigation system is configured to determine a maneuver instruction sequence based on traffic data and/or vehicle data. The maneuver instruction sequence includes a series of directional instructions for responding to the traffic data and/or vehicle data. At least some of the directional instructions are represented for display as a series of generic navigational indicia.

20 Claims, 10 Drawing Sheets

APPARATUS, SYSTEM AND METHOD FOR DETOUR GUIDANCE IN A NAVIGATION SYSTEM

BACKGROUND

The present disclosure is directed to navigation devices and systems. More specifically, the present disclosure is directed to navigational processing for efficiently updating and communicating real-time maneuver changes on a navigational map.

Navigation systems are electronic, processor-based systems that aid in navigation. Navigation systems may be configured to be entirely on board a vehicle or vessel, or they may be located elsewhere and communicate via radio or other signals with a vehicle or vessel, or they may use a combination of these methods. Navigation systems may be capable of containing maps, which may be displayed in human readable format via text or in a graphical format, determining a vehicle or vessel's location via sensors, maps, or information from external sources, providing suggested directions to a human in charge of a vehicle or vessel via text or speech, providing directions directly to an autonomous vehicle such as a robotic probe, providing information on nearby vehicles or vessels, or other hazards or obstacles, and providing information on traffic conditions and suggesting alternative directions.

Examples of conventional navigational systems may be found in U.S. Pat. Pub. No. 2013/0173159 to Trum et al., titled "Navigation Device" published Jul. 4, 2013; U.S. Pat. Pub. No. 2010/0138146 to Vogt et al., titled "Routing Method, Routing Arrangement, Corresponding Computer Program, And Processor-Readable Storage Medium," published Jun. 3, 2010; U.S. Pat. No. 7,522,997 to Asahara et al., titled "Navigation Apparatus," issued Apr. 21, 2009; and U.S. Pat. No. 5,220,507 to Allan M. Kirson, titled "Land Vehicle Multiple Navigation Route Apparatus," issued Jun. 15, 1993; each of which is incorporated by reference in their entirety herein.

Navigation devices are known to be configured to provide alternate routes and to provide guidance. However, the manner in which alternate routes are presented in navigation systems is not optimally effective and intuitive to use for a driver. As current navigational system map displays become more saturated with information, users become overwhelmed by the data being displayed to them. This issue becomes more acute in instances where navigation data is changed and/or updated in real time to incorporate a change in status of a navigational path (e.g., traffic accident, congestion, etc.). As a navigational map may already be filled with different information encoded by colors, icons and text (e.g. street or city names, road types, points-of-interest, speed-and-flow information, availability of parking spaces, etc.), a sudden change in the navigational path and/or status may not be presented efficiently in order to allow the user to act upon new navigational information. Furthermore, incorporating updates and/or sudden changes into conventional navigation systems would needlessly complicate the navigational experience and even be potentially distracting and a hazard for a driver.

For example, if markers are used in a conventional navigation system to show different estimated time of arrival (ETA) or length of an alternative route on the map, the driver may confuse this with icons for points-of-interest (POI) or route names. Furthermore, if the alternative routes are drawn in a certain color, the meaning of this color may not be known to the driver or it may be confused with other information that is encoded by coloring of the streets (e.g. the road type). What is needed is a system that allows short-term maneuvering instructions/sequences to be displayed to a user in an efficient and non-distracting way.

SUMMARY

Accordingly, in order to reduce distraction and/or cognitive load of a driver using a navigation system, the present disclosure discloses a navigation system that supplements navigation by providing maneuver guidance in the form of real-time abstract driving recommendations, such as lane guidance, maneuvers descriptors, etc. in a cluster instrument or head up display, instead of the full map. In one embodiment, a navigation system's display may interrupt the map display and only show the maneuver guidance for the duration of the maneuver. The maneuver guidance and accompanying descriptors may be displayed as simplified rendered images that are chosen based on an analysis of the intersection's geometry in the map. The maneuver guidance advantageously augments maneuver descriptors using information about alternative routes and their suitability. In one embodiment, the information is encoded by highlighting at least a segment of a field-of-use driving area display (e.g., 180°, 360°), also referred to herein as a radial maneuver indicator, for an optimal and alternative, sub-optimal, routes.

In one embodiment, a system is disclosed for providing navigational maneuver instructions, comprising a navigation apparatus configured to generate navigation map data on a navigation system display, where the navigation apparatus comprises a communications input for receiving at least one of traffic data and vehicle data. A secondary display apparatus may be communicatively coupled to the navigation system, wherein the navigation system is configured to determine a maneuver instruction sequence based on the at least one of traffic data and vehicle data. The maneuver instruction sequence may comprise a series of directional instructions for responding to the at least one of traffic data and vehicle data, and wherein at least some of the directional instructions are represented for display as a series of generic navigational indicia.

In another embodiment, a method is disclosed for providing navigational maneuver instructions, comprising generating a navigation map data on a navigation apparatus display and determining a maneuver instruction sequence based on the at least one of traffic data and vehicle data received at a communication input on the navigation apparatus, wherein the maneuver instruction sequence comprises a series of directional instructions for responding to the at least one of traffic data and vehicle data, and wherein at least some of the directional instructions are represented for display as a series of generic navigational indicia.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
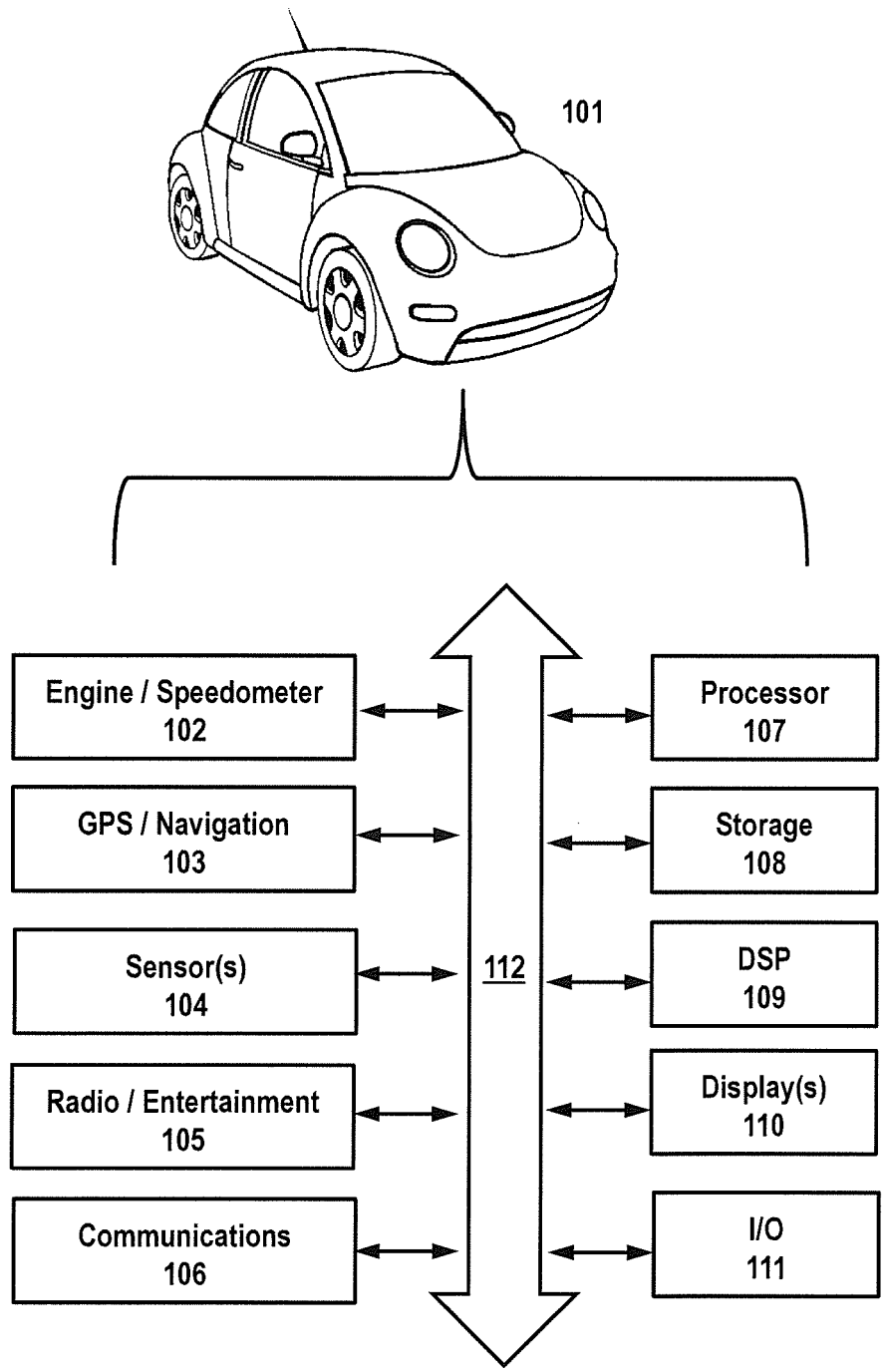
FIG. 1 illustrates an exemplary vehicle system block diagram showing multiple components and modules, together with a navigational system under one embodiment.

Exemplary embodiments will now be described more fully with reference to the accompanying drawings.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

It will also be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Various embodiments will be described herein below with reference to the accompanying drawings. In the following description, well-known functions or constructions are not described in detail since they may obscure the invention in unnecessary detail.

Turning to FIG. 1, the drawing illustrates an exemplary vehicle system 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) and navigation module 103 provides navigation processing and location data for vehicle 10. Sensors 104 provides sensor data which may comprise data relating to vehicle characteristic and/or parameter data (e.g., from 102), and may also provide environmental data pertaining to the vehicle, its interior and/or surroundings, such as temperature, humidity and the like. Other sensors may include proximity sensors and/or cameras for sensing objects and/or traffic proximate to vehicle 101. Radio/entertainment module 105 may provide data relating to audio/video media being played in vehicle 101. Module 105 may be integrated and/or communicatively coupled to an entertainment unit configured to play AM/FM radio, satellite radio, compact disks, DVDs, digital media, streaming media and the like. Communications module 106 allows any of the modules to communicate with each other and/or external devices via a wired connection or wireless protocol, such as LTE, 3G, Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system of FIG. 1. Storage 108 may be configured to store data, software, media, files and the like. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicia from any module in FIG. 1, and may be a configured as one or more of LCD, LED, OLED, or any other suitable display. Display may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 1A:
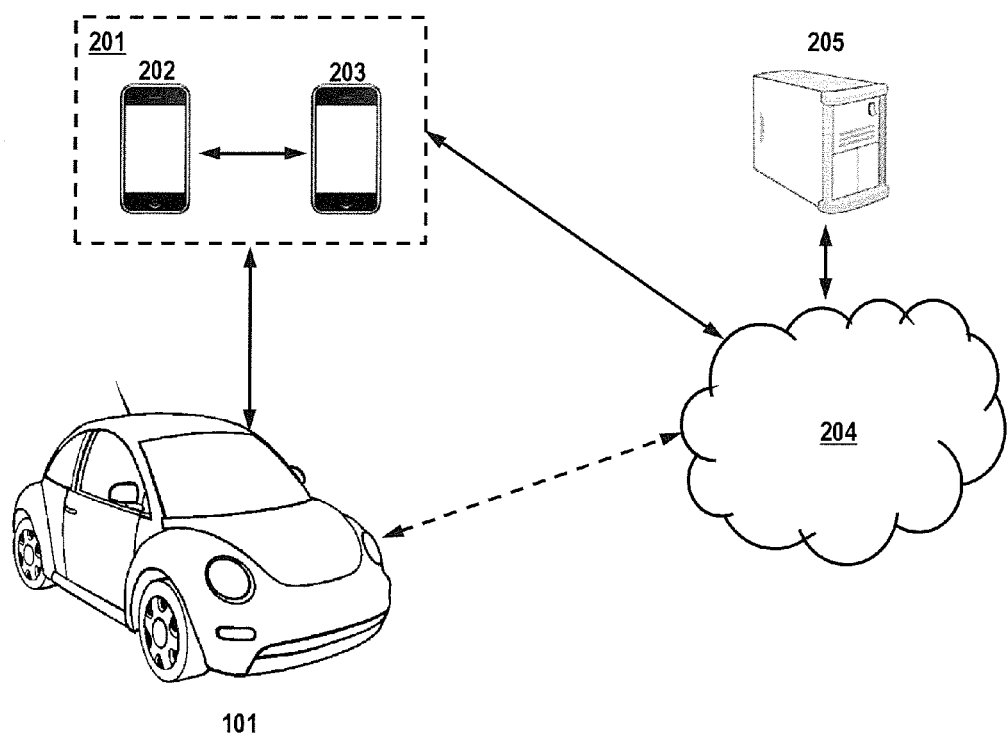
FIG. 1A illustrates an exemplary vehicle communication block diagram, where the vehicle of FIG. 1 may communicate with a networks, as well as one or more portable devices that also may be configured o communicate over the network'.
Figure 2:
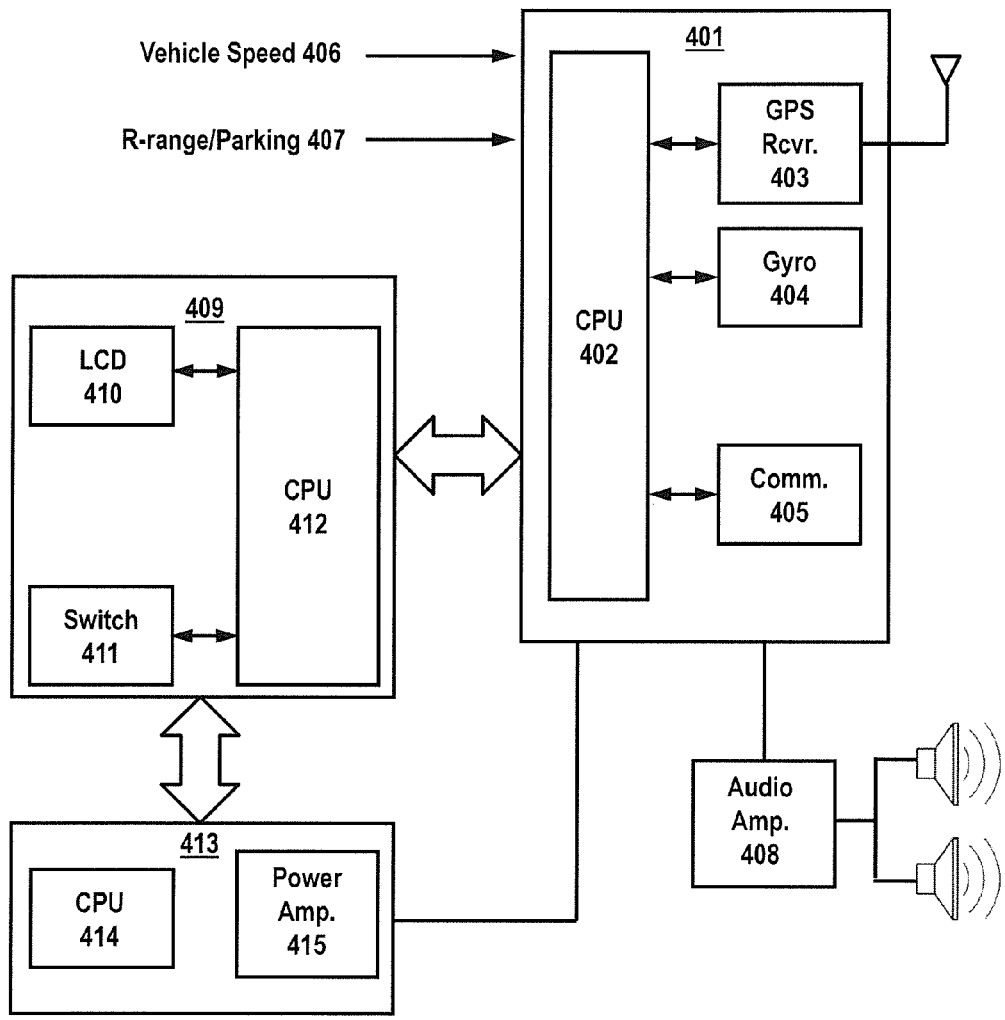
FIG. 2 is an exemplary bock diagram of a vehicle navigational system suitable for use in the exemplary system of FIG. 1 under one embodiment.

Turning to FIG. 1A, an exemplary embodiment is illustrated, where a vehicle 101 (see FIG. 1), is paired with one or more devices 201 (202, 203) which may be registered to one or more users. Devices 201 may be registered with vehicle 101 using Bluetooth pairing or using WiFi or NFC registration, as is known in the art. Preferably, device 201 registrations are stored (e.g., 108) at the vehicle according to a device ID or SIM ID, and may further include a device user profile associated with each ID that may include demographic data, user interests, and/or user device/vehicle history. In the embodiment of FIG. 2, devices 202, 203 may configured to communicate navigational data with vehicle 101, and may be further configured to communicate with each other. Portable devices 201 are also configured to communicate with wireless network 204 in order to send/receive data from a central server 205. Similarly, in one embodiment, vehicle 101 may also be configured to communicate with network 204. Server 205 may be also configured to perform back-end processing for devices 201 and vehicle 101, and further communicate with other remote servers for additional functionalities, such as supplementary map data, navigational data, and the like.

Turning now to FIG. 2, an exemplary vehicle navigation system is disclosed comprising a car navigation unit 401 comprising a CPU 402, GPS receiver 403 and gyroscope 404. Additionally, navigation unit 401 may include communications 405, allowing navigation unit 401 to communicate with portable devices, such as device(s) 202-203, discussed above. Navigation unit may receive vehicle speed signal 406 and R-range/parking signal 407 to track vehicle movement and status. Navigation unit 401 utilizes GPS receiver 403 to acquire position data to locate the user on a road in the unit's map database. Using a road database, unit 401 can give directions to other locations along roads also in its database. Dead reckoning using distance data from sensors attached to the drivetrain, gyroscope 405 and an accelerometer (not shown) can be used for greater reliability, as GPS signal loss and/or multipath can occur due to urban canyons or tunnels.

The road database for navigation unit 401 may be a vector map containing some area of interest. Street names or numbers and house numbers may be encoded as geographic coordinates so that a user can find some desired destination by street address or, as will be discussed in greater detail below, by a generic or specific name. Points of interest (waypoints) may also be stored with their geographic coordinates. Point of interest specialties include speed cameras, fuel stations, public parking, and so forth. Contents can be produced by the user base as a vehicle drive along existing streets (cellular, Wi-Fi) and communicating via the internet, yielding an up-to-date map. Navigation mapping formats may include geographic data files (GDF), and may also include other formats, such as CARiN, SDAL and NDS PSF.

Navigation unit 401 may further be advantageously configured to receive traffic data directly from external sources via communications 405, or alternately via a portable device (202-203), wherein the portable device communicates traffic data to navigation unit 401 via communications 405. Traffic data may be acquired from traffic data suppliers, such as traffic.com and INRIX, where such suppliers acquire and collect traffic data from road sensors, local departments of transportation, data collected from operators of large fleets of vehicles, and other manual sources such as traffic helicopters and acquiring traffic data from police scanners. Traffic data may be provided using a plurality of delivery methods. One exemplary method is through a wireless data system such as MSN Direct, where traffic data is collected by traffic.com and sent over wireless airwaves to a receiver that is either built into the GPS or added as an external antenna. Another exemplary method of delivery is via a "silent" transmission over FM radio.

In addition to audio heard from a radio station (e.g., via radio/entertainment module 105), other "silent" signals can be sent over the frequency. A special FM antenna may either be built into the navigation unit 401 or connected as an antenna which listens for the special signals being broadcast over FM radio frequencies. Yet another exemplary method for traffic data delivery may include utilizing a data connection from a portable device (202-203). The portable device may be configured to connect to the Internet over the device's cellular connection, downloads the traffic information, and sends it via Bluetooth or other suitable means to the navigation unit 401.

Traffic data may be delivered using a plurality of data types that can be received about the road network. Some exemplary data types comprise parking data, incident data and traffic flow data. Incident data refers to information generally about a specific point/event on a road such as an accident or construction work. Flow data refers to the average speed vehicles are currently traveling on a particular section of road. In one embodiment, navigation system 401 is configured to receive both types of data. This would be advantageous, for example, if a road only has incident coverage, and unexpected bad weather causes traffic to back up. As this scenario may not be detected by incident data (since there technically is not a particular accident causing slower traffic), dual coverage that includes flow data would detect the back up more efficiently.

Figure 4:
FIG. 4 illustrates an exemplary maneuver instruction under one exemplary embodiment, where the maneuver instruction is provided on an instrument cluster.

Continuing with the embodiment in FIG. 4, Navigation unit 401 may be further coupled to LCD unit 409 and audio unit 413, where LCD unit 409 may comprise LCD screen 410, CPU 412 and on/off switch 411. Audio unit 413 may comprise CPU 414 and power amplifier 415. Output of audio unit 413 may be forwarded to audio amplifier 408 for output to a user.

In one embodiment, navigation unit 401 may be communicatively coupled to a secondary display unit, such as an instrument cluster display or head-up display (HUD) for displaying maneuver instructions, data, or other information. While not explicitly shown in FIG. 4, HUD may be part of (or an addition to) display 110 of FIG. 1 and comprise a projector unit, a combiner and a video generation computer. The projection unit in the HUD may comprise an optical collimator setup with a convex lens or concave mirror with a light emitting diode, or liquid crystal display at its focus. This configuration may produce an image in the vehicle where the light is parallel (i.e., perceived to be at infinity). The combiner may comprise an angled flat piece of glass (a beam splitter) located directly in front of the driver, that redirects the projected image from the projector in such a way as to see the field of view and the projected infinity image at the same time. A combiner may be configured to have special coatings that reflect monochromatic light projected onto it from the projector unit while allowing all other wavelengths of light to pass through. In some optical layouts combiners may also have a curved surface to refocus the image from the projector. A processor may provide an interface between the HUD and the navigation unit and/or other devices associated with the navigation system to be displayed, and generates the imagery and symbols/text to be displayed by the projection unit.

Figure 3:
FIG. 3 illustrates an exemplary route highlighted on a navigational map under one embodiment.

As mentioned above, the present disclosure improves on conventional navigation systems in that maneuver instructions may be provided to a user in a manner that supplement or even supplant conventional navigational display. Navigation system are configured to guide a driver along a route to his or her destination and may be configured to highlight a route on a navigational map 350 as illustrated in FIG. 3, or display individual maneuvers to take to follow the route 450 as illustrated in FIG. 4. To provide information to the driver and display relevant properties of the route, some characteristic values are calculated and displayed, such as the estimated time of arrival (ETA), remaining distance to destination (ROD), remaining traveling time (RTT) or total road toll. If guidance for a route is active but the driver does not follow the suggested a maneuver (i.e. is deviating from the route) the previous route is dropped and a new route calculation is started which results in a new route. The updated route is then drawn to the map and the maneuvers to follow this route are displayed to the driver. The route's characteristic values like ROD, RTT, ETA or total toll costs are also updated.

However, in some traffic situations, it may be difficult for the driver to follow the calculated route. For example, there are situations which would cause delays or stress if the driver followed the route, such as malfunctioning traffic lights, traffic incidents or congestion, etc. In certain cases, these situations are not considered by the navigational system when calculating the route, since they may not be known at the time.

Utilizing parking data, incident data and/or traffic flow data, described above, impromptu maneuver instructions may be generated to accommodate real-time changes in a navigational route. For the purposes of this disclosure, "real time" refers to the time in which traffic data may be processed for the purposes of modifying navigation. As the receipt of traffic data may be different for different types of delivery mechanisms, maneuver instructions may not be capable of generation until after a few seconds and/or multiple minutes after traffic data is received. In addition to the use of incident data and/or traffic flow data, the maneuver instructions may be generated from data produced from the vehicle itself.

In one embodiment, the navigation system may be configured to provide maneuver instructions based on some vehicle characteristic threshold detected from the vehicle sensors or other vehicle characteristic data. For example, if the navigation system detects that the vehicle has activated the brakes, and reduced speed to less than 10 MPH more than five times in a one mile navigation road segment, the navigation system may assume this as traffic congestion. As such, the navigation system may automatically transition to providing maneuvering instructions to move the vehicle to a different navigational path. In one embodiment, a driver may be prompted (e.g., "Congestion Detected. Choose Alternate Path (Y/N)") before entering a maneuvering instruction mode.

In another example, the system may determine that the vehicle is at an extended stop (e.g., 20 seconds) in the middle of a road without intersections. This situation would be indicative that some incident has occurred, such as a traffic accident or a delivery truck that is blocking traffic. Similar to the previous example, the system would initiate maneuvering instructions to navigate from the current path from the location.

FIGS. 5A-D provide simplified maneuvering instructions under various embodiments. As discussed above, the maneuvering instructions may be provided on an instrument cluster and/or a HUD, concurrently with the navigational map that is being displayed on the navigation system screen, in order to present the maneuver instructions independently in a simplified and efficient manner. Alternately, the maneuvering instructions may supplant or interrupt the map display on the navigation system screen in another embodiment.

Figure 5A:
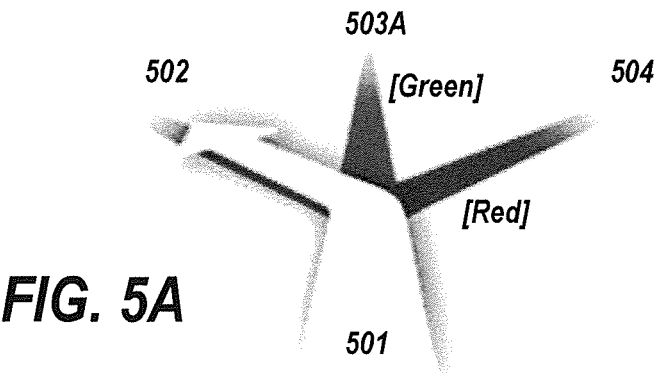
FIG. 5A illustrates an exemplary maneuver instruction for a red traffic light or malfunctioning light not originally considered by the navigational system under one embodiment.

Turning to FIG. 5A, an exemplary embodiment is illustrated, where a vehicle's current navigation route 501 is determined to have an incidental problem, such as a malfunctioning light, train crossing, etc. Accordingly, the system displays the graphic of FIG. 5A on an instrument cluster display or head-up display, indicating a current maneuver 502 to maintain the current route, along with alternate routes 503A and 504. In one example, alternative route 504 is graphically changed to a red route, indicating that a problem has been detected. Utilizing the processor (402) of the navigational unit, a current optimal maneuver 502 is determined and displayed, indicating that the driver may choose to veer left and maintain the current route. A secondary optimal route 503A is highlighted in green, indicating that the driver has the option to drive straight and still maintain navigation characteristics (e.g., ETA, RTT, RDD) within threshold parameters. The secondary route is advantageous in that the driver is given multiple options in deciding which route to take, which gives drivers more flexibility on deciding a route based on true real-time conditions presently observed by the driver. Thus, as an example, if the driver notices multiple vehicles merging or turning into the direction of route 502, it may be assumed that this addition of vehicles has a high potential of creating congestion further down the navigational path. As such, the driver, upon making this observation, may choose to take path 503A in an attempt to avoid potential traffic-related problems.

It can be appreciated in the present disclosure, and discussed in greater detail below, that one of the advantageous characteristics of the maneuvering instructions is that they are presented to the user as generic navigational indicia. For the purposes of this disclosure, "generic navigational indicia" refers to non-map-related (i.e., not highlighted on a navigational map display) indications of a direction in which a vehicle should optimally drive. Some examples of generic navigational indicia comprise arrows, shapes, forms, radial navigation representations (e.g., radial maneuver indicator, segmented radial maneuver indicator, discussed in greater detail below), and the like. Generic navigational indicia may further comprise shaded, highlighted and/or colored representations of the aforementioned arrows, shapes, forms, radial navigation representations, etc.

Figure 5B:
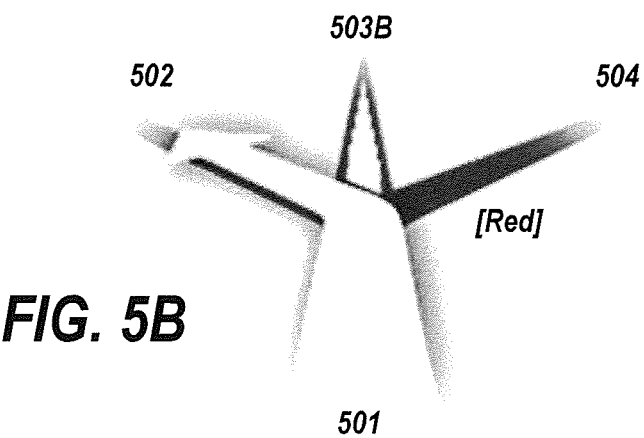
FIG. 5B illustrates an exemplary maneuver instruction for a spontaneous incident, such as a traffic jam, not originally considered by the navigational system under one embodiment.

FIG. 5B illustrates another embodiment in which an incident is detected for navigational path 504, which is one alternate for maneuver 502 calculated and displayed to maintain a current path (501). In this example, alternate path 503B is known, but traffic/sensor data is inconclusive or incomplete on whether or not path 503B is suitable for the driver to take. In this example, path 503B may not be highlighted, indicating that insufficient information is available for the navigational path. Of course, other configurations are possible as well. For example, the system may highlight path 503A in a neutral color (e.g., grey) or in another suitable color (e.g., yellow).

Figure 5C:
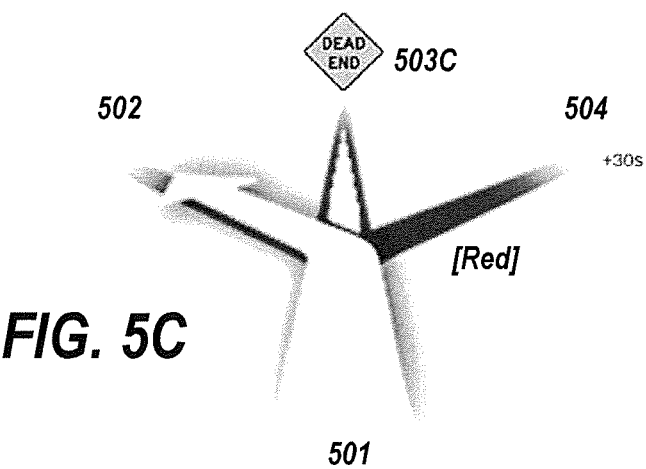
FIG. 5C illustrates an exemplary maneuver instruction for lane changing during congested traffic not considered by the navigational system under one embodiment.
Figure 5D:
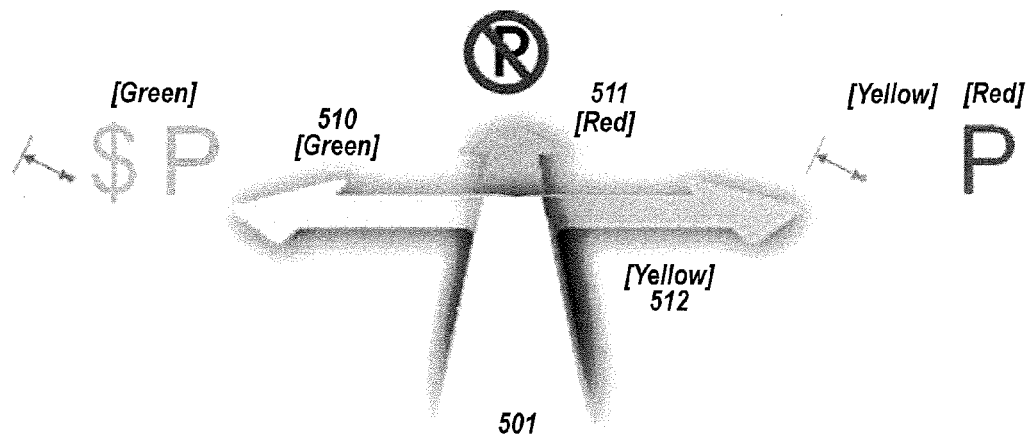
FIG. 5D illustrates an extended maneuver instruction and effect on navigation preference for the navigational route entered into the navigational system under one exemplary embodiment.

FIG. 5C illustrates another embodiment, where icons may be added to the maneuver instructions. In this example, navigational path 503C is additionally configured to indicate that other issues, such as a dead end, exist along navigational path 503C. As such, a "dead end" icon may be displayed alongside the navigational path as shown. FIG. 5D illustrates another embodiment wherein maneuver instructions are displayed near a destination point. In this example, the navigation system may be configured such that, as a vehicle approaches a threshold distance from a destination (e.g., 2 miles), maneuver instructions are automatically triggered. In certain circumstances, such as when a vehicle approaches a destination in a highly-populated urban area, maneuver instructions on the instrument cluster or head-up display may be advantageous to avoid distractive viewing and re-viewing of a navigational display during hectic city driving. Furthermore, additional information regarding the route, such as POIs and the like, may efficiently be displayed without distraction or clutter.

In FIG. 5D, the system indicates from navigational path 501 that an optimal maneuver path 510 is available in which ample parking is available and does not involve tolls (signified in the example by illuminating the parking and "$" icon in green). A secondary maneuver path is shown in 512, which is available but not optimal for the driver, and is thus illuminated in yellow. Issues of concern for path 512 involves the lack of available parking (signified by illuminating the parking icon in red) and the presence of toll roads (signified by illuminating the "$" icon in yellow). Maneuver route 511 is illuminated in red indicating that no parking is available for the navigational route. In one embodiment, navigation system 401 (and/or device 202-203) may be in communication with third party network databases that track and provide data for, e.g., parking prices, gas prices, hotel prices, hotel ratings, restaurant type/rating etc. to provide more granular maneuver detail for the driver.

Figure 6:
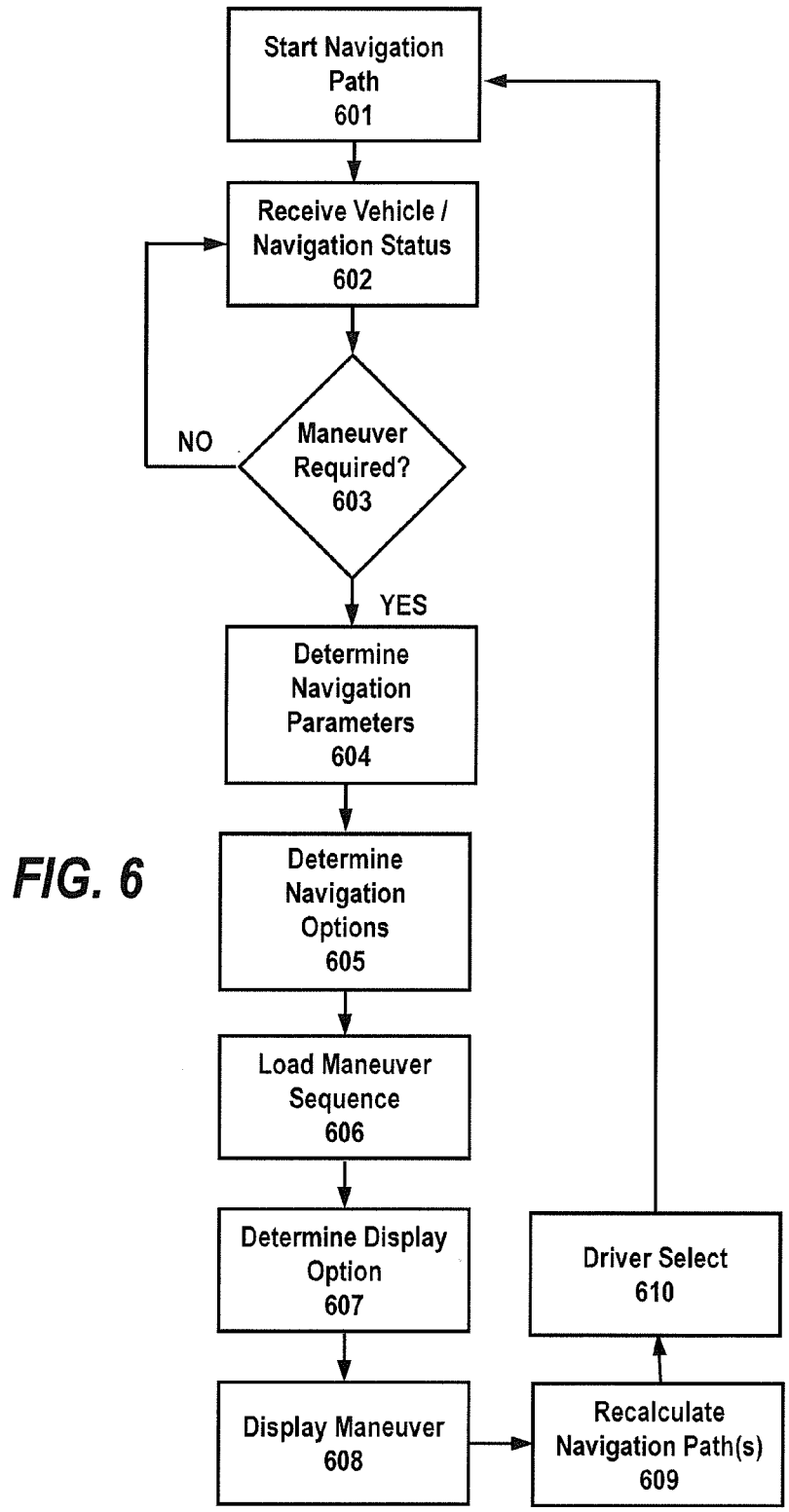
FIG. 6 illustrates a method for determining use of maneuver instructions and presenting a sequence of maneuver instructions to a driver in concert with a navigational system under one exemplary embodiment.

FIG. 6 illustrates an exemplary process for generating maneuver instructions as discussed above. As a navigation path is entered and started 601 by the navigation system, the system receives vehicle and/or navigation status data 602. Vehicle status data may include occurrence and/or frequency of brake activation, current speed, average speed for various predetermined time increments, frequency of lane change, or any other data indicative of a manner in which a vehicle is operated by a driver. Navigation status data may include vehicle navigation location, navigation path, traffic data, POI data, third-party POI data and the like.

As the navigation system monitors vehicle/navigation status data, a determination is made in 603 on whether or not a maneuver instruction is required. This determination may be dependent upon one or more thresholds set in the navigation system. For example, as discussed above, if a manner in which a vehicle is being operated (e.g., applying brakes more than 5 times in a 5 minute increment on an open road, vehicle sensors detecting presence of surrounding vehicles for 15 minutes) exceeds a predetermined threshold, this may trigger a maneuver instruction. Similarly, if navigation system receives traffic data indicating reduced traffic flow and/or a traffic incident, a maneuver instruction may be triggered. Conversely, if no adverse data is detected in 603 ("NO") the process continues to receive and process vehicle/navigation status in 602 without resorting to maneuver instructions. It is understood by those skilled in the art that maneuvering instructions may be automatic, but may also be manually triggered by a driver, e.g., by pressing a button or softkey.

In step 604, once a maneuver instruction is triggered, the navigation system determined navigation parameters for the maneuver instruction. The parameters may comprise data relating to ETA, RTT, RDD, toll roads, traffic data, third party data, etc. relating to alternate routes associated with the original navigational route. In step 605, the navigation system processor processes and determined navigation options for the maneuver instructions, and loads the maneuver sequence 606 for presentation to the driver. In 607, navigation system determines display options for the maneuver instructions, which may comprise (i) displaying maneuver instructions on an instrument cluster of the vehicle, (ii) displaying maneuver instructions on a head-up display in the vehicle, (iii) interrupting the navigation screen and displaying the maneuver instructions instead, and/or (iii) transmitting maneuver instructions for display on a portable device.

As the maneuver instruction sequence is displayed 608 and ultimately completed, the navigation system recalculates the navigation path in 609. As the maneuver sequence will change the original navigation path, it would be advantageous to recalculate the navigation path after completion to determine if the original navigation path is still optimal, and, if so, update the navigation path data (e.g., ETA, RTT, RDD). In certain circumstances, if the original navigational path is no longer optimal, alternate navigation routes may be presented to the driver, where the alternate route is selected by the driver 610, and the alternate route now becomes the new route and navigation is resumed 601.

Figure 7A:
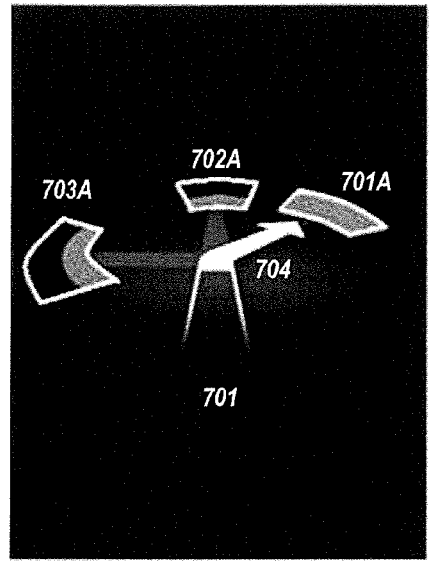
FIGS. 7A-C illustrate various configurations in which maneuver instructions may be intuitively displayed to a user under various exemplary embodiments.
Figure 7B:
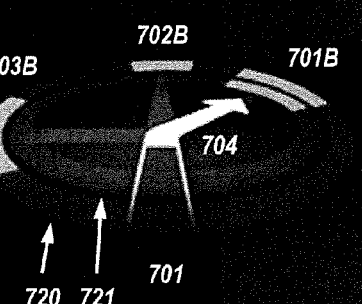
Figure 7C:
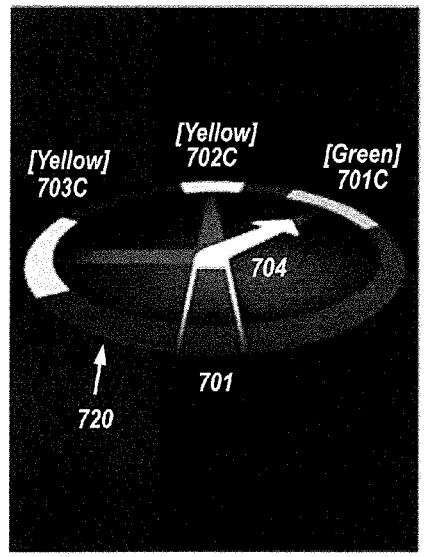

FIGS. 7A-C illustrate other exemplary embodiment for maneuver instruction display, wherein the data/information is displayed on an instrument cluster or HUD as shown. In FIG. 7A, a navigation route 701 is subjected to maneuver processing in the example, where the maneuver instruction options comprise three routes (701A, 702A, 703A) displayed radially from the navigation point (701). Here, determined maneuver route 704, which indicates a driver's current route, is accompanied with a fully illuminated bar 701A. Routes 702A and 703A are gradationally illuminated, which in this example comprises ½-bar illumination, to indicate that routes 702A and 703A are optional, but potentially sub-optimal routes. It should be understood by those skilled in the art that other gradations (e.g., ¼ gradation, ⅓ gradation, etc.) may be used as well to indicate an optimal level for the route.

FIG. 7B illustrates another embodiment, where navigation route 701 is similarly subjected to maneuver processing in the example, where the maneuver instruction options comprise three routes (701B, 702B, 703B) displayed radially from the navigation point (701). Here, the radial area surrounding navigation point 701 includes a plurality of radial maneuver indicators (720-721) spanning 360°. Current maneuver route 704 is highlighted in 701B via illumination on both radial maneuver indicators 720-721 to show that current maneuver route 701B is the optimal maneuver route. As can be seen from the figure, routes 702B and 703B are illuminated on only one of the plurality of radial maneuver indicators to indicate that the routes are available, but sub-optimal routes.

The embodiments of FIGS. 7A-B are particularly advantageous for instrument cluster displays or HUDs that are monochromatic, or have limited color options available. By using the gradational illumination as disclosed in FIG. 7A, or the plurality of radial maneuver indicators as disclosed in FIG. 7B, drivers may quickly and easily identify maneuver options and information. In the embodiment of FIG. 7C, another example is disclosed where a single radial maneuver indicator 720 is illustrated, and optimal route 701C is illuminated in green, while sub-optimal routes 702C-703C are illuminated in yellow. Such a configuration may be advantageous in applications where an instrument cluster display or HUD has color display capabilities. Of course, it should be understood by those skilled in the art that various combinations of the embodiments are envisioned by the present disclosure as well.

Figure 8A:
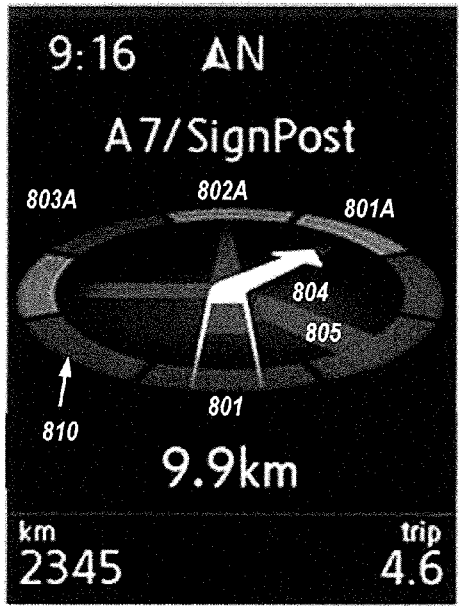
FIGS. 8A-D illustrate further various configurations in which maneuver instructions may be intuitively displayed to a user under various exemplary embodiments.
Figure 8B:
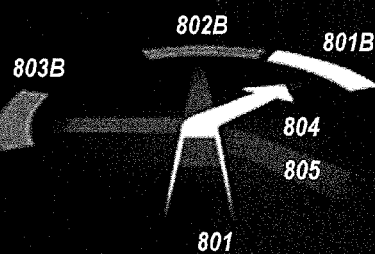
Figure 8C:
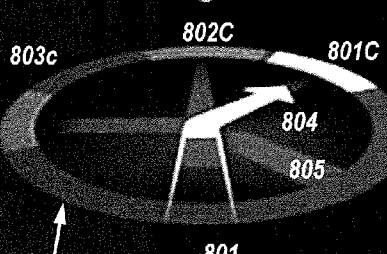

FIGS. 8A-C illustrate further embodiments of maneuver instruction display, where, in the embodiment of FIG. 8A, a segmented radial maneuver indicator 810 is provided. A current route 804 may be displayed for a navigation point 801, where potential maneuver paths 801A-803A are highlighted. Furthermore, navigational path 805 is shown as an existing path, but is experiencing incidents, characteristics or other issues that may impair driving or significantly affect route travel (e.g., ETA, RTT, RDD). Accordingly, path 805 is not highlighted as an option in the example. In addition to the maneuver instructions, further data, such as road/highway ("A7/Signpost"), trip distance ("9.9 km"), time ("9:16"), direction ("N"), mileage ("km") and distance traveled ("4.6") may be displayed.

The embodiment of FIG. 8B is similar to the example of FIG. 8B, expect that only maneuverable portions of the segmented radial maneuver indicator (810) are displayed, and route 801B is highlighted as the optimal route. The embodiment of FIG. 8C illustrates a (non-segmented) radial maneuver indicator similar to the embodiments in FIG. 7A-C.

Figure 8D:
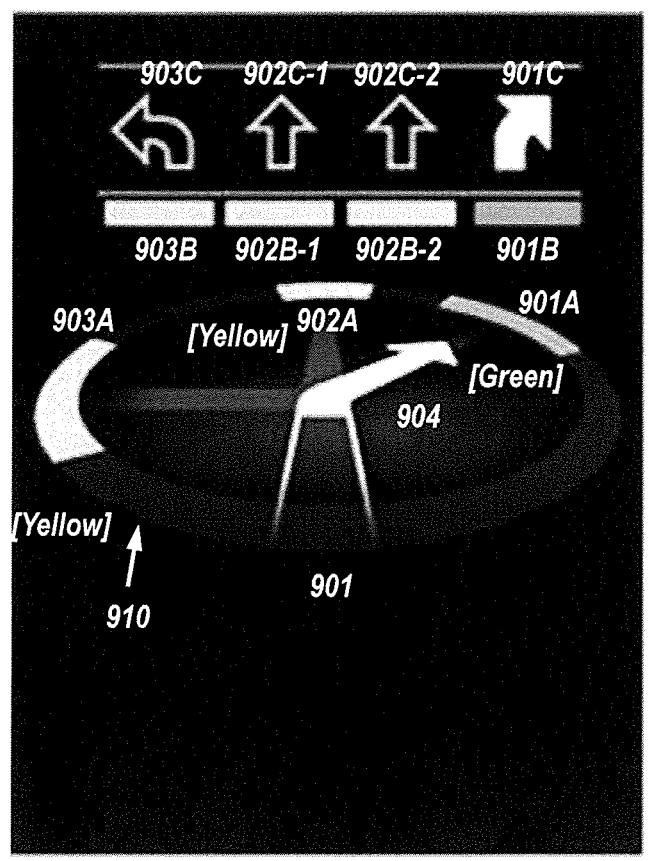

A still further embodiment is illustrated in FIG. 8D, where the maneuver instructions are supplemented by a lane-maneuver segment, shown in the top portion of the figure. In FIG. 8D, an optimal maneuver path 904 is determined for navigation point 901, where the path is further emphasized by 901A, which may be illuminated as a green color, and is illustrated in the example as part/segment of radial maneuver indicator 910. Furthermore, sub-optimal maneuver paths are shown as segments 902A and 903A and may be illuminated in a yellow color to indicate it as such.

In the example of FIG. 8D, the configuration may be advantageous in that maneuver paths are redundantly illuminated to provide greater ease of reading and comprehension by a driver, particularly during quick maneuver situations, such as lane changing. As before, data for the lane-changing maneuvers may be provided from In the configuration of FIG. 8D, optimal maneuver path 901A may represent a right-most lane of a road or highway, which is redundantly illuminated as a bar (901B) and arrow (901C). Thus, in this example, as path 901A is illuminated green, bar 901B and arrow 901C may be illuminated simultaneously. A first sub-optimal path 902A represents a current lane the vehicle is in, and may be redundantly illuminated as bars 902B-1, 902B-2 and arrows 902C-1, 902C-2, which may represent two center lanes of a 4-lane road or highway. As sub-optimal maneuver path 902A is illuminated yellow, bars 902B-1, 902B-2 and arrows 902C-1, 902C-2 may be illuminated or highlighted simultaneously as well. Similarly, sub-optimal maneuver path 903A may represent the left-most lane in a road or highway, and may be redundantly illuminated as bar 903B and arrow 903C. As maneuver path 903A is illuminated yellow, bar 903B and arrow 903C are illuminated simultaneously in a similar manner.

It can be appreciated by those skilled in the art that the present disclosure provides a simplified and elegant solution for navigation systems in displaying maneuvering instructions that are carried out independently from the navigational map display provided on conventional navigation systems. In one embodiment, as drivers perform the maneuvering instructions, the existing navigation path data (e.g., ETA, RTT, RDD) is not provided immediately, as the system's (short-term) purpose is to maneuver the driver out of a current traffic incident or traffic characteristic. Once the maneuver sequence is completed, the maneuvering instructions may be automatically and/or manually deactivated, wherein the navigation system automatically begins recalculating navigation path data from the maneuvered-to location and presents the new map data on the navigation system display. Alternately, the driver may be prompted to resume navigation, with the option to update/revise navigation preferences for the remainder of the trip.

In one embodiment, the maneuvering instructions may be activated via voice commands through vehicle electronics known in the art, or via voice commands entered into a portable device that is communicatively coupled to the vehicle system. In another embodiment, maneuvering sequences may be scrollable to allow drivers to move forward and/or backward through a sequence. Under a still further embodiment, one or more default maneuvering instruction preferences may be entered and stored to allow maneuvering instructions to override existing preferences stored for the navigation system.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for providing navigational maneuver instructions, comprising:
    a navigation apparatus configured to generate navigation map data on a navigation system display, the navigation apparatus comprising a communications input for receiving traffic data and vehicle data; and
    a secondary display apparatus, communicatively coupled to the navigation system,
    wherein the navigation system is configured to determine a maneuver instruction sequence based on the traffic data and vehicle data,
    wherein the maneuver instruction sequence comprises a series of directional instructions for responding to the traffic data and vehicle data, and
    wherein at least some of the directional instructions are represented for display as a series of generic navigational indicia.

2. The system of claim 1, wherein the generic navigational indicia comprises two or more of arrows, shapes, forms, icons and radial navigation representations.

3. The system of claim 2, wherein the generic navigational indicia is configured to be at least one of shaded, highlighted and colored for display.

4. The system of claim 2, wherein the radial navigation representation comprises one of a radial maneuver indicator and a segmented radial maneuver indicator, each indicator spanning 360 degrees.

5. The system of claim 1, wherein at least one of the series of directional instructions comprise generic navigational indicia indicating an optimal navigation route and a sub-optimal navigation route.

6. The system of claim 1, wherein the at least some of the directional instructions are represented for display on the secondary display apparatus independently from the navigation system display.

7. The system of claim 6, wherein the secondary display apparatus comprises one of an instrument cluster display, a head-up display and a portable device display.

8. The system of claim 1, wherein the traffic data comprises at least one of traffic incident data, traffic flow data, traffic sensor data and parking availability data.

9. The system of claim 1, wherein the vehicle data comprises data received from the vehicle indicating a manner of usage for the vehicle over a predetermined period of time.

10. The system of claim 1, wherein the navigation apparatus is configured to generate new navigation map data upon completion of the maneuver instruction sequence.

11. A method for providing navigational maneuver instructions, comprising:
generating navigation map data on a navigation apparatus display; and
determining a maneuver instruction sequence based on traffic data and vehicle data received at a communication input on the navigation apparatus, wherein the maneuver instruction sequence comprises a series of directional instructions for responding to the traffic data and vehicle data, and wherein at least some of the directional instructions are represented for display as a series of generic navigational indicia.

12. The method of claim 11, wherein the generic navigational indicia comprises two or more of arrows, shapes, forms, icons and radial navigation representations.

13. The method of claim 12, wherein the generic navigational indicia is configured to be at least one of shaded, highlighted and colored for display.

14. The method of claim 12, wherein the radial navigation representation comprises one of a radial maneuver indicator and a segmented radial maneuver indicator, each indicator spanning 360 degrees.

15. The method of claim 11, wherein at least one of the series of directional instructions comprise generic navigational indicia indicating an optimal navigation route and a sub-optimal navigation route.

16. The method of claim 11, wherein the at least some of the directional instructions are represented for display on a secondary display apparatus independently from the navigation system display.

17. The method of claim 16, wherein the secondary display apparatus comprises one of an instrument cluster display, a head-up display and a portable device display.

18. The method of claim 11, wherein the traffic data comprises at least one of traffic incident data, traffic flow data, traffic sensor data and parking availability data.

19. The method of claim 11, wherein the vehicle data comprises data received from the vehicle indicating a manner of usage for the vehicle over a predetermined period of time.

20. The method of claim 11, further comprising generating new navigation map data upon completion of the maneuver instruction sequence.

* * * * *